April 4, 1961  E. C. WITTKE  2,978,631
TRANSFORMER PICK-OFF
Filed Aug. 1, 1957

INVENTOR
ERNEST C. WITTKE
BY
ATTORNEY

United States Patent Office 2,978,631
Patented Apr. 4, 1961

2,978,631

TRANSFORMER PICK-OFF

Ernest C. Wittke, Westbury, N.Y., assignor to Sperry Rand Corporation, a corporation of Delaware Filed Aug. 1, 1957, Ser. No. 675,650

3 Claims. (Cl. 323—45)

This invention relates to a pick-off of the differential transformer type which generates a signal responsive to the displacement of two relatively movable objects. In particular, the present invention relates to compensating means for providing a null adjustment of a differential transformer type pick-off.

For purposes of explanation, the present invention will be described with respect to a differential transformer E-type pick-off that functions as a linear accelerometer wherein the armature of the E-type pick-off is the acceleration sensitive element and the stator of the E-type pick-off is fixedly mounted. It will be obvious to those skilled in the art that the present invention is not limited to accelerometers but is universally adaptable to any differential transformer type pick-off.

In the manufacture of differential transformer E-type pick-offs, it is necessary to have a zero output signal when the armature is in a balanced condition with respect to the stator. If this condition does not exist there will be an error output voltage from the pick-off which is undesirable. The initial setting of the armature with respect to the stator may be disturbed as a result of, for example, temperature changes and shock, thereby causing an erroneous output. A portion of this error may be corrected by manual adjustment with certain type E pick-offs but this is impossible if, for example, the pick-off is hermetically sealed. It is desirable in many instances to remotely and accurately provide a means for a null adjustment of the E-type pick-off without disturbing the elements of the pick-off per se. If an external compensating voltage is used to obtain a null adjustment, it must be of the proper magnitude, phase and polarity.

Therefore, it is an object of the present invention to provide a means for adjusting the output of a pick-off to a null condition without disturbing the pick-off itself.

A further object of the present invention is to provide compensating means for obtaining a null adjustment of a pick-off that is remotely located from the pick-off.

An additional object of the present invention is to provide a compensating means for obtaining a null adjustment on a transformer type pick-off that is always in proper phase relation with respect to the phase of the pick-off.

These and other objects of the present invention are accomplished by winding an auxiliary compensating secondary winding around the center leg of an E-shaped differential transformer pick-off. The current induced in the compensating secondary winding may then be passed through a variable voltage divider to provide a signal equal and opposite to the error signal for balancing out the error signal. The signal thus obtained from the compensating winding will be of the proper phase since it is induced by the same source that induces the error signal. The magnitude and polarity of the compensating signal may be adjusted by means of a variable voltage divider and a reversing switch, for example, thereby providing a null adjustment means that may be remotely located from the pick-off itself.

Other objects and advantages will occur to those skilled in the art from a consideration of the following specification taken in connection with the accompanying drawings, wherein like reference characters indicate like elements, in which.

Figure 1:
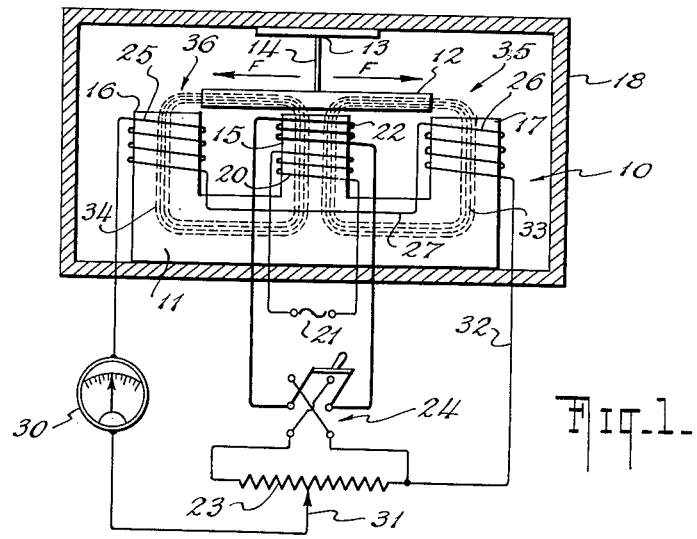
Fig. 1 shows a schematic diagram of one embodiment of the present invention applied to a linear accelerometer of the differential transformer type.

Referring now to Fig. 1, a linear accelerometer 10 of the differential transformer type is shown as an E-type pick-off having a stator 11 fixedly mounted and a movable armature 12 disposed within a hermetically sealed housing 18. The armature 12 is suitably pivoted about pivot point 13 by means of flexible member 14 such that armature 12 functions as an acceleration sensitive element. For purposes of example, it is to be assumed that armature 12 is responsive to accelerations acting only to the right or to the left as viewed in the drawings. Armature 12 is disposed to cooperate with the center leg 15 and outer legs 16 and 17 of stator 11 in a manner to be described.

Wound around the center leg 15 of stator 11 is a primary winding 20 that is connected to and excited by a suitable source of alternating current 21. Also wound around the center leg 15 of stator 11 is an auxiliary compensating secondary winding 22. A variable voltage divider, such as potentiometer 23, is connected between the ends of compensating secondary winding 22 through a reversing switch 24.

Secondary windings 25 and 26 are wound on the outer legs 16 and 17, respectively, of the stator 11. The secondary windings 25 and 26 are connected in series and are differentially wound, i.e., wound in opposite directions with respect to each other. One end of winding 25 is connected via lead 27 to the opposite end of winding 26. The other end of winding 25 is connected via a suitable indicator 30 to the slider 31 of potentiometer 23. The other end of winding 26 is connected via lead 32 to one end of potentiometer 23. The output of the accelerometer 10 is taken across indicator 30.

In the operation of the system of Fig. 1, in the absence of an acceleration to the left or to the right, as viewed in the drawing, it is desirable that the armature 12 be located equidistant from outer legs 16 and 17. When the primary winding 20 is excited by source 21, magnetic flux paths 33 and 34 will be established between the armature 12 and the stator 11 as indicated by the dotted lines. Assuming the armature 12 to be centrally located, the lengths of the air gaps 35 and 36 will be equal and, therefore, the reluctance of flux paths 33 and 34 will be the same and equal voltages will be induced in the secondary windings 25 and 26. Since the secondary coils 25 and 26 are wound in series opposition, the induced voltages will be equal in magnitude and opposite in direction providing a zero resultant output voltage.

In the presence of a force caused by an acceleration, for example, to the right, as viewed in the drawing, the position of the acceleration responsive mass, i.e., armature 12 will be shifted with respect to the outer legs 16 and 17 resulting in increasing the length of air gap 35 and decreasing the length of air gap 36. This results in a decrease in the reluctance of magnetic flux path 34 and an increase in the reluctance of magnetic flux path 33, thereby causing an increased voltage to be induced in winding 25 and a decreased voltage to be induced in winding 26. Since the induced voltages in the differentially wound secondary windings 25 and 26 are no longer equal, there will be a resulting output voltage which is equal to the difference between the induced voltages in windings 25 and 26. This output voltage is proportional to the accelerating force F. If the acceleration responsive mass, i.e. armature 12, is displaced in the opposite direction because of an acceleration force to the left, as viewed in the drawings, air gap 36 will increase and air gap 35 will decrease resulting in an output voltage having the opposite phase.

It is evident that for ideal operation, the acceleration responsive mass, i.e., armature 12, should be exactly centered with respect to the secondary windings 25 and 26 in the absence of an accelerating force. If this condition does not exist, there will be an output error voltage from the secondary windings 25 and 26 when there is no accelerating force F applied to the device.

In the manufacture, particularly, of accelerometers of this type, it has always been a problem to eliminate this error voltage. In addition, temperature changes and shock may cause the secondary coils 25 and 26 and the armature 12 to change position with respect to each other, thus causing error voltages. Particularly with respect to hermetically sealed accelerometers, it is desirable to provide a means for making a null adjustment exteriorly of the pick-off elements per se.

By means to be described, the null adjustment of the present invention is simple and inexpensive and may be made at any time after final assembly of the device without the necessity of breaking the seal of the hermetically sealed case wherein the pick-off element is disposed.

Assuming now that there is an error output voltage in the system resulting from the induced voltage in winding 26 being greater than the induced voltage in winding 25, this error voltage will appear between one end and the slider 31 of the potentiometer 23 as shown in Fig. 1. The voltage induced in compensating winding 22 will exist between the two ends of potentiometer 23. By means of reversing switch 24, the induced voltage in compensating winding 22 may be switched so as to oppose the error voltage and by means of the slider 31 of potentiometer 23, the proper magnitude of compensating voltage may be selected to exactly cancel the magnitude of the error voltage as indicated on indicator 30. To insure that the error voltage may be completely cancelled, the compensating winding 22 is designed to provide an induced voltage that is greater than the maximum error voltage likely to be encountered. By the use of reversing switch 24 and potentiometer 23, any error voltage may be cancelled out regardless of its phase. Moreover, the compensating voltage and the error voltage will always be in phase with each other since they are both produced by the same excitation source and flux field.

Figure 2:
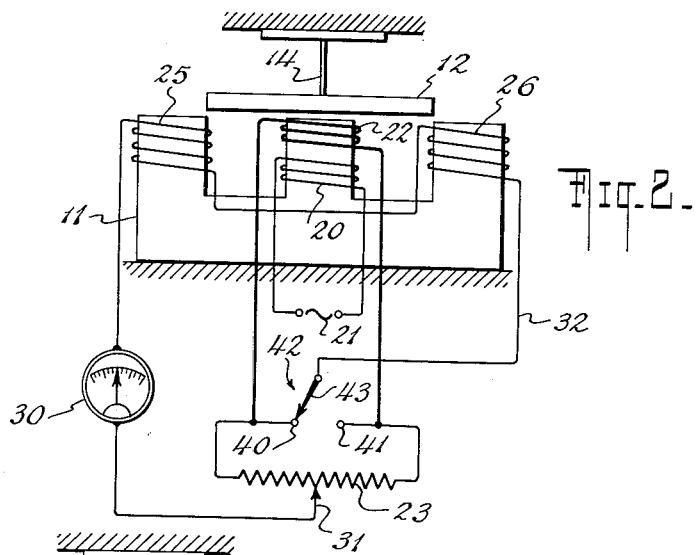
Fig. 2 shows a schematic diagram of an additional embodiment of the invention applied to a linear accelerometer of the differential transformer type.

Figure 2 shows an alternative switching arrangement that accomplishes the same result as the embodiment of Fig. 1. In the embodiment of Fig. 2, the ends of compensating secondary winding 22 are respectively connected to the ends of potentiometer 23 via contacts 40 and 41 of switch 42. Further, lead 32 from one end of secondary winding 26 is connected to contact arm 43 of switch 42.

In the operation of the embodiment of Figure 2, the phase of the error voltage across potentiometer 23 is reversed by means of switch 42. In this case, the phase of the compensating voltage across potentiometer 23 is maintained constant while the phase of the error voltage is varied to obtain the necessary cancellation which is the opposite arrangement from Fig. 1.

Figure 3:
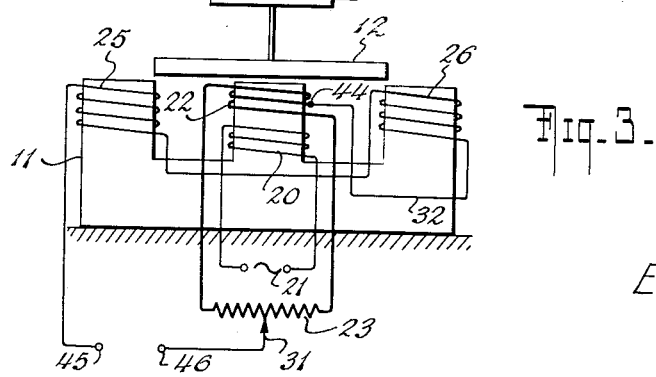
Fig. 3 is a schematic diagram of another embodiment of the invention also applied to a linear accelerometer of the differential transformer type.

The embodiment of the invention shown in Fig. 3 eliminates the reversing switch entirely. In this embodiment, the ends of compensating secondary winding 22 are respectively connected directly to the ends of potentiometer 23. Compensating secondary winding 22 has a center tap 44 to which lead 32 from one end of secondary winding 26 is connected. By this means, potentiometer 23 provides the null adjustment across output terminals 45 and 46 by suitable positioning of slider 31.

In the operation of Figure 3, if there is no error voltage produced in the secondary windings 25 and 26 and if the slider 31 of potentiometer 23 is exactly centered, there will be zero voltage across the output terminals 45 and 46 in the absence of acceleration forces. This is due to the fact that the voltage on terminal 45 is taken from the center tap 44 of compensating winding 22 and the voltage on terminal 46 is taken from the centrally located slider 31 of potentiometer 23. Since the same voltage drop appears across compensating winding 22 and potentiometer 23, the center position of each will be at the same potential and the potential difference across output terminals 45 and 46 will be zero.

When an error voltage appears in the differentially wound secondary windings 25 and 26, an unbalance will occur and an error voltage will appear between the output terminals 45 and 46. This error voltage is corrected by moving the slider 31 of potentiometer 23 the proper distance, either to the right or to the left, depending upon the magnitude and sense of the unbalance error voltage.

Although the present invention has been described for purposes of explanation with respect to a hermetically sealed accelerometer pick-off device, it will be appreciated that it is equally useful and time saving when used with any pick-off device whether the pick-off elements per se are sealed or not.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In combination, a transformer type pick-off having armature and stator elements cooperatively disposed with respect to each other, said stator element having a center leg and at least two outer legs, a primary coil wound on said center leg for providing excitation, a secondary coil wound on each of said outer legs, said secondary coils being differentially wound with respect to each other, a compensating coil wound on the center leg and responsive to the excitation provided by said primary coil, and a variable voltage divider connected to the ends of said compensating coil, one end of a first secondary coil being connected to a center tap on said compensating coil and the other end of said first secondary coil being connected to one end of a second secondary coil and the remaining end of said secondary coil being connected to the slider of said variable voltage divider whereby error signals due to system unbalance may be nulled.

2. In combination, a magnetic core member having a central leg and at least two outer legs, an armature member mounted in magnetic flux relation with said core member, an exciting winding on said central leg adapted to be connected to a source of alternating potential for providing excitation, a compensating winding on said central leg and responsive to the excitation provided by said exciting winding for providing a signal in accordance with the current induced therein, a variable resistance having an adjustable tap, said compensating winding being connected across said variable resistance, a pickup winding on each of said outer legs, said pickup windings being connected in opposition and to output terminals to produce an output voltage indicative of the difference in reluctance of the magnetic path between said central leg through said armature to said outer legs, one of said output terminals being connected to the adjustable tap on said variable resistance, the circuit including said compensating winding, said pickup coils and said resistance being so disposed and relatively arranged that the amplitude and phase of said signal may be varied to cancel error signals in the secondary coils due to system unbalance.

3. In combination, a transformer type pick-off having armature and stator elements positionably and cooperatively disposed with respect to each other, said stator element having a center leg and two outer legs, a primary coil wound on said center leg for providing excitation, a secondary coil wound on each of said outer legs, said secondary coils being differentially wound with respect to each other and serially connected, a compensating coil wound on the center leg and responsive to the excitation provided by said primary coil for providing a signal in accordance with the current induced therein, variable voltage dividing means connected to said compensating coil and responsive to said signal, reversing switch means connected to said variable voltage dividing means for selectively reversing the direction of current flow through said variable voltage dividing means, and means for connecting said secondary coils to said variable voltage dividing means whereby the amplitude and phase of said signal may be varied to cancel error signals in the secondary coils due to system unbalance.

References Cited in the file of this patent

UNITED STATES PATENTS

| | | |
|---|---|---|
| 2,461,238 | Schaevitz | Feb. 8, 1949 |
| 2,640,971 | MacGeorge | June 2, 1953 |
| 2,692,969 | Baring | Oct. 26, 1954 |
| 2,882,484 | Swainson | Apr. 14, 1959 |